US012237592B2

(12) United States Patent
Sano

(10) Patent No.: US 12,237,592 B2
(45) Date of Patent: Feb. 25, 2025

(54) ELECTRONIC DEVICE AND ANTENNA CHARACTERISTIC ADJUSTING METHOD

(71) Applicant: CASIO COMPUTER CO., LTD., Tokyo (JP)

(72) Inventor: Takashi Sano, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 17/668,023

(22) Filed: Feb. 9, 2022

(65) Prior Publication Data

US 2022/0285846 A1 Sep. 8, 2022

(30) Foreign Application Priority Data

Mar. 5, 2021 (JP) ................................ 2021-034889

(51) Int. Cl.
*H01Q 1/27* (2006.01)
*H01Q 9/04* (2006.01)
*H01Q 9/28* (2006.01)

(52) U.S. Cl.
CPC ............ *H01Q 9/0485* (2013.01); *H01Q 9/28* (2013.01)

(58) Field of Classification Search
CPC ...... H01Q 9/0485; H01Q 9/28; H01Q 1/1207; H01Q 1/273; H01Q 1/12
See application file for complete search history.

(56) References Cited

U.S. PATENT DOCUMENTS

2014/0085153 A1* 3/2014 Nagahama ............... H01Q 1/44 343/720
2016/0204292 A1* 7/2016 Saito ..................... H01L 31/042 136/246
2017/0040701 A1* 2/2017 Hanabusa ................ H01Q 7/00
2019/0137950 A1* 5/2019 Sano ...................... G04G 17/06
2019/0137951 A1* 5/2019 Uematsu ................ G04R 60/08

FOREIGN PATENT DOCUMENTS

CN 103676637 A 3/2014
JP 2013-183437 A 9/2013

OTHER PUBLICATIONS

First Office Action dated Feb. 20, 2024 received in Chinese Patent Application No. 202210209962.2.

* cited by examiner

*Primary Examiner* — Awat M Salih
(74) *Attorney, Agent, or Firm* — Scully, Scott, Murphy & Presser, P.C.

(57) ABSTRACT

An electronic device includes a case and an antenna provided on the case. The electronic device also includes the following. A first adjuster is formed of a metal material. The first adjuster (i) is provided in a position in which one end side is provided to come into contact with or to be near the antenna and (ii) in which the other end side is provided in the case. A cylinder is included in the case, is formed of a metal material, and the other end side of the first adjuster is inserted therein. A second adjuster is formed of a dielectric material and is provided in the cylinder to exist between the cylinder and the first adjuster.

14 Claims, 9 Drawing Sheets

FIG.9
HIGH
LOW
FREQUENCY[GHz]
LOW
HIGH
HEIGHT OF NUT[mm]

ELECTRONIC DEVICE AND ANTENNA CHARACTERISTIC ADJUSTING METHOD

CROSS-REFERENCE TO RELATED APPLICATIONS

This application is based upon and claims the benefit of priority under 35 USC 119 of Japanese Patent Application No. 2021-034889 filed on Mar. 5, 2021, the entire disclosure of which, including the description, claims, drawings, and abstract, is incorporated herein by reference in its entirety.

BACKGROUND OF THE INVENTION

1. Field of the Invention

The present invention relates to an electronic device and an antenna characteristic adjusting method.

2. Description of the Related Art

Conventionally, in an electronic device such as a watch, there are devices that receive satellite radio waves in order to obtain accurate time information and position information.

For example, JP 2013-183437 describes a configuration in which a ring shaped antenna ("ring antenna" in JP 2013-183437) is positioned on top of a main body case ("case exterior" in JP 2013-183437) and the bottom surface of the main case functions as a ground plane.

The characteristics (frequency, gain) of the antenna are affected by the components placed around the antenna and the material of the components. Therefore, in order to obtain the desired characteristics such as the desired frequency, it is necessary to perform adjustments to match the frequency by adjusting the position and structure of the antenna, and the shape of the surrounding components.

BRIEF SUMMARY OF THE INVENTION

An electronic device includes, a case; an antenna provided on the case; a first adjuster which is formed of a metal material, and (i) which is provided in a position in which one end side is provided to come into contact with or to be near the antenna and (ii) in which the other end side is provided in the case; a cylinder which is included in the case, which is formed of a metal material, and in which the other end side of the first adjuster is inserted; and a second adjuster which is formed of a dielectric material and which is provided in the cylinder to exist between the cylinder and the first adjuster.

An electronic device includes, a case formed of resin; an annular shaped antenna provided on the case; a third adjuster which is formed of a metal material, and (i) which is provided in a position in which one end side is provided to come into contact with or to be near the antenna and (ii) in which the other end side is provided in the case; and a fourth adjuster which is formed of a metal material, in which one end side is inserted in the case from the other end side of the third adjuster, and which is provided with a predetermined distance from the other end side of the third adjuster.

An antenna characteristic adjusting method performed when a metal first adjuster provided to be in contact with or to be near an antenna provided on a case is provided so that the other end side is inserted in a cylinder which is provided in the case and which is formed of a metal material, and a second adjuster which is formed of a dielectric material is provided existing between the cylinder and the first adjuster, the method includes, changing a length of the first adjuster inserted in the cylinder and adjusting an overlapped range in which the first adjuster and the second adjuster are overlapped in the cylinder.

DETAILED DESCRIPTION OF THE INVENTION

First Embodiment

A first embodiment of the electronic device and the antenna characteristic adjusting method according to the present invention is described with reference to FIG. 1 to FIG. 5. In the description of the embodiment described below, the electronic device is a main body of a watch.

Although various technically preferable limitations to implement the present invention are included in the embodiments described below, the scope of the present invention is not limited to the embodiments and illustrated examples described below.

Figure 1:
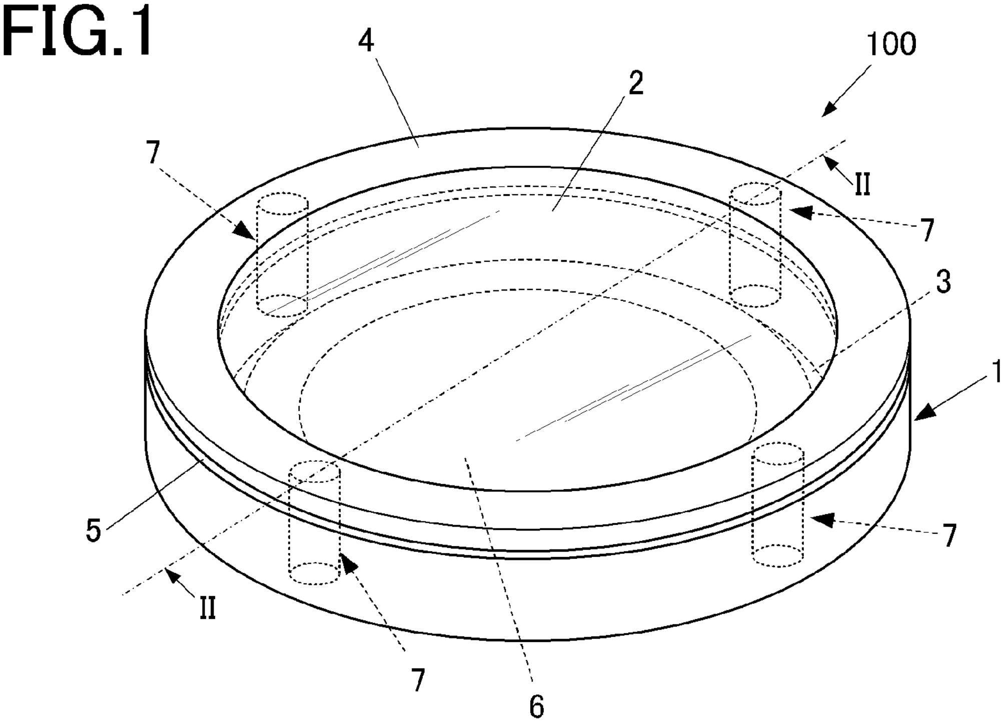
FIG. 1 is a perspective view showing a main portion of a watch main body which is an electronic device according to the first embodiment.
Figure 2:
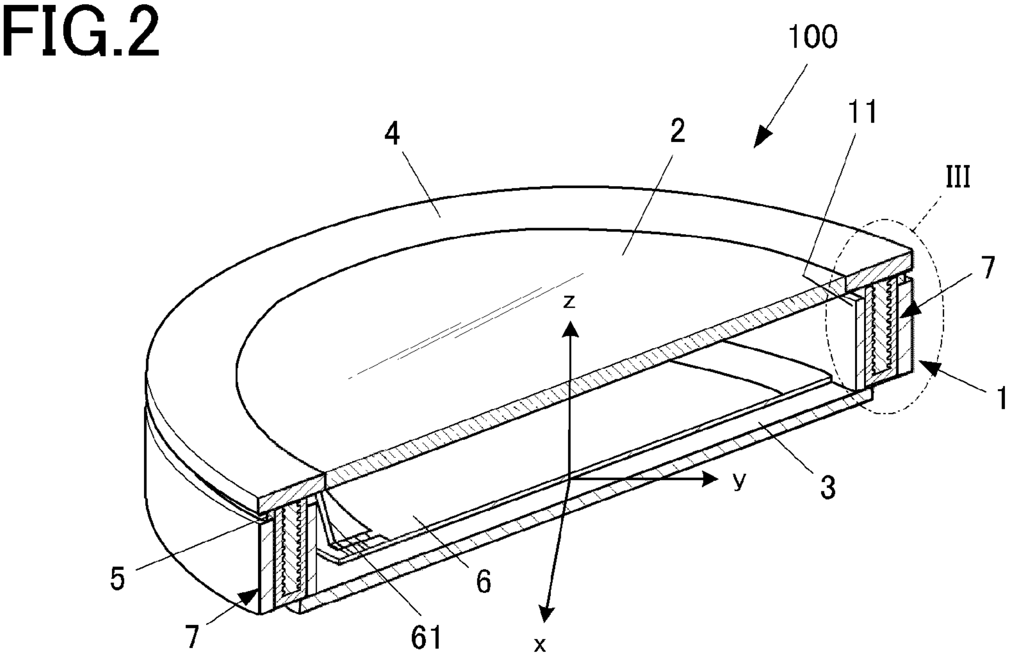
FIG. 2 is a cross-sectional view along line II-II of the watch main body as shown in FIG. 1.

FIG. 1 is a perspective view showing a main portion of the watch main body which is the electronic device according to the present embodiment. FIG. 2 is a cross-sectional view along line II-II of the watch main body shown in FIG. 1.

As shown in FIG. 1 and FIG. 2, the watch main body 100 according to the present embodiment includes a case (hereinafter referred to as "main body case 1" in the present embodiment) formed in a hollow short column shape open at the top and the bottom (front and rear of the watch) in a thickness direction (Z-axis direction in FIG. 2).

The main body case 1 in the illustrated example is formed in a cylindrical shape that is a substantial circle in a plan view viewed from above. The shape of the main body case 1 and the watch main body 100 including the main body case 1 is not limited to the illustrated example. For example, the shape may be an elliptical shape in a plan view viewed from above, or a polygonal columnar shape.

According to the present embodiment, the main body case 1 is formed of a metal material such as SUS or titanium. The material from which the main body case 1 is formed is not limited to the examples above.

A windshield member 2 formed of transparent glass, etc. and including light transmittance properties is provided on the opening 11 on the front surface side (viewing side of the watch or upper side) of the main body case 1 so as to cover the opening 11. A rear lid 3 is attached as a cover material to close the opening on the rear surface side (side not viewed of the watch or bottom side) of the main body case 1.

According to the present embodiment, the rear lid 3 is formed of a conductor including various metal material such as SUS and titanium, and functions as a GND (ground plane).

The material with which the rear lid 3 is formed is not limited to the examples shown here. The rear lid 3 may be formed of the same material as the main body case 1 or may be formed of a different material.

An antenna element 4 (antenna) included in an antenna (for example, patch antenna) is provided on the main body case 1. The antenna element 4 according to the present embodiment is a bezel material formed in an annular shape. The antenna element 4 is provided on the upper side (front surface side of the main body case 1, viewing side of the watch) of the main body case 1.

The shape of the antenna element 4 is not limited to the illustrated examples.

Here, in addition to a circular ring shape from a plan view, annular widely includes a shape that is oval or rectangular and is connected as one. Annular as described here is not limited to a completely closed ring shape, and widely includes a shape with a gap in a portion such as a C-shape.

The material with which the antenna element 4 is formed is not limited, but when conductivity of the material used for forming the antenna element 4 is low (resistivity is high), there is a possibility that sufficient antenna gain cannot be obtained.

Therefore, preferably, metal material with a certain degree of conductivity or more (that is, a certain degree of resistivity or less) is used as the material with which the antenna 4 is formed. For example, SUS (stainless steel) or titanium is suitably used. Moreover, it is not desirable for the watch main body 100 which is the electronic device to become heavy, and it is preferable that the antenna element 4 is formed of a material which is as light as possible.

A substrate 6 that includes an electric circuit (not shown) is provided on the rear lid 3.

A connector 61 is connected to the antenna element 4, and the antenna element 4 is connected to the electric circuit of the substrate 6 by the connector 61.

The connector 61 is a contact member for feeding power, and the antenna element 4 is connected to, for example, a LC circuit, etc. as the electric circuit provided on the substrate 6 through the connector 61.

A dielectric member 5 formed with a dielectric material such as resin is provided between the antenna element 4 and the main body case 1. For example, the dielectric member 5 is formed in an annular shape substantially the same as the antenna element 4 formed in the annular shape, for example. The dielectric member 5 is positioned to overlap with the antenna element 4.

By providing the dielectric member 5 which is an insulating member between the antenna element 4 and the metal main body case 1, it is possible to prevent direct contact between the antenna element 4 and the metal main body case 1. With this, it is possible to prevent short circuit occurring.

The dielectric member 5 is to include a width to stably support the antenna element 4 so that the antenna element 4 does not come into contact with the main body case 1. Therefore, the dielectric member 5 does not necessarily have to overlap with the same shape as the antenna 4.

The dielectric member 5 may be an O-ring provided between the antenna element 4 and the main body case 1, and in this case, the dielectric member 5 may function as a sealing member (second sealing member) so that the inside of the main body case 1 is watertight.

A characteristic adjuster 7 that adjusts the antenna characteristics is provided on the lower side (rear surface side, non-viewing side) of the antenna element 4.

The characteristic adjuster 7 includes a first adjuster, a cylindrical shaped portion, and a second adjuster.

As shown in FIG. 1, according to the present embodiment, four characteristic adjusters 7 are provided at substantially equal intervals along the circumference of the main body case 1. The number of characteristic adjusters 7 is not limited to the illustrated examples. The number may be three or less or five or more.

Figure 3:
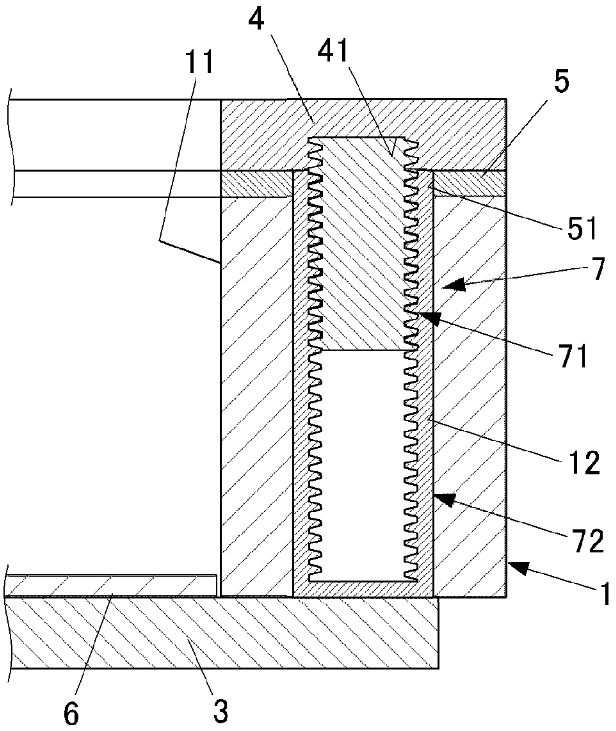
FIG. 3 is an enlarged cross-sectional view of the surroundings of a characteristic adjuster shown with a frame with a long and short dash line III in FIG. 2.
Figure 4:
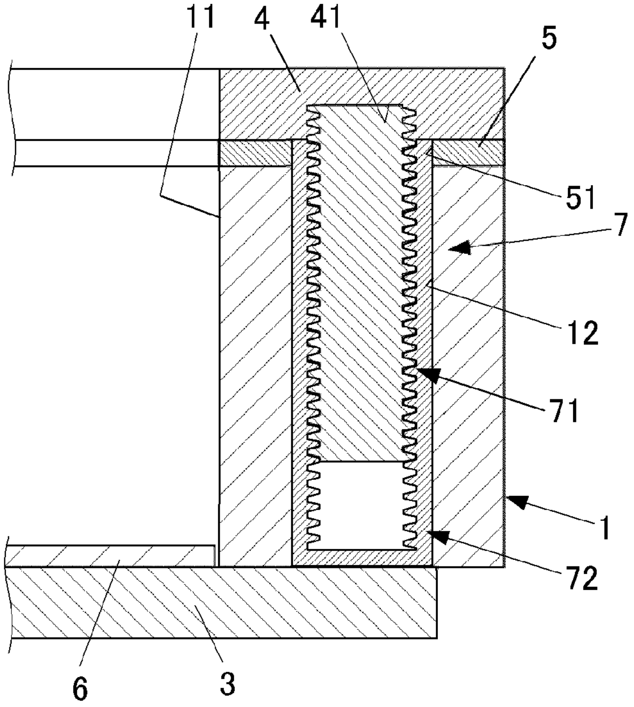
FIG. 4 is a diagram showing an enlarged cross-sectional view of the surroundings of the characteristic adjuster shown with the frame with a long and short dash line III in FIG. 2, and a length of a screw being longer than FIG. 3.

FIG. 3 and FIG. 4 are enlarged cross-sectional views of the portion surrounding the characteristic adjuster enclosed by a short and long dash line frame III in FIG. 2.

As shown in FIG. 3 and FIG. 4, a concave portion 41 corresponding to the position where the characteristic adjuster 7 is provided is formed in the lower side surface (rear surface, surface on the non-viewing side) of the antenna element 4. A female thread is cut on the inner circumference surface of the concave portion 41.

A screw 71 (so called grub screw) in which a male thread that screws to the female screw cut on the inner circumference surface of the concave portion 41 is formed on at least one end side is screwed in each concave portion 41.

The screw 71 according to the present embodiment is formed of a metal material such as SUS. The screw 71 is a first adjuster in which one end side is in contact with the antenna element 4 and the other end side is positioned in the main body case 1.

Preferably, from the viewpoint of the outer appearance of the watch main body 100, the entire screw 71 as the first adjuster is provided on the non-viewing side of the antenna element 4.

Therefore, for example, according to the present embodiment, the depth of the concave portion 41 formed on the rear surface side of the antenna element 4 is to be a depth that does not penetrate to the front surface (viewing side) of the antenna element 4. With this, the tip of the screw 71 screwed in the concave portion 41 is not projected to the viewing side of the antenna element 4 and stops on the rear surface side. Consequently, the outer appearance is not affected.

The screw 71 which is the first adjuster is to be positioned so as to come into contact with the antenna element 4, and is not limited to being fixed to the antenna element 4 by screwing as shown in the illustrated example. A pin that is not threaded can be positioned by simply pressing the pin into the concave portion 41.

Moreover, the first adjuster may be capacitively coupled with the antenna element 4, and in this case, even if one end side is not in contact with the antenna element 4, the first adjuster is to be provided close enough to be capacitively coupled to the antenna element 4.

A hole 12 that penetrates a thickness direction (Z-axis direction in FIG. 2) is formed in the portion where the characteristic adjuster 7 is provided in a circumference wall of the main body case 1.

According to the present embodiment, the hole 12 formed in the metal main body case 1 is formed with a metal material. The hole 12 is a cylinder shaped portion (cylinder) in which the other end side of the first adjuster (screw 71 of the present embodiment) is to be inserted.

The hole 12 which is the cylinder shaped portion according to the present embodiment is formed in the main body case 1 in contact with the rear lid 3 as GND, and the hole 12 is a conductor with the same potential as the GND.

As shown in FIG. 3 and FIG. 4, a through hole 51 is provided in the dielectric member 5 in the position corresponding to the hole 12. The screw 71 can be inserted in the hole 12 through the through hole 51.

A nut 72 which is the second adjuster formed with a dielectric material such as resin is positioned in the hole 12 which is the cylinder shaped portion so as to exist between the hole 12 which is the cylinder shaped portion and the screw 71 which is the first adjuster.

The nut 72 according to the present embodiment includes a height substantially the same as a thickness of the main body case 1 (height of main body case 1, height in Z-axis direction as shown in FIG. 2).

The end of the screw 71 on the inserting side (lower side end in FIG. 3 and FIG. 4) inserted in the hole 12 is received in the nut 72 so that even if the screw 71 is in the longest state, there is no contact with the main body case 1 (hole 12 formed in the main body case 1, etc.) and the metal rear lid 3.

According to the present embodiment, the screw 71 is to be a grub screw in which the male thread is formed on the outer circumference surface from one end side to the other end side, and the female thread that screws to the male thread formed on the screw 71 is formed on the inner circumference surface of the nut 72.

According to the present embodiment, the screw 71 which is the first adjuster is screwed to the nut 72 which is the second adjuster so that the inside of the main body case 1 is watertight. In this case, the threaded portions of the screw 71 and the nut 72 (that is, the male thread of the screw 71 and the female thread of the nut 72) function to be a sealing member in order to make the inside of the main body case 1 watertight.

The configuration in which the screw 71 is screwed to the nut 72 is not necessary, and the first adjuster such as a simple screw can be received by a second adjuster fitted in the hole 12.

In this case, as the sealing member (first sealing member) in order to make the inside of the main body case 1 watertight, a gasket, O-ring, or the like can be provided separately around the axis of the screw 71 in order to seal between the hole 12 which is the cylinder shaped portion or the nut 72 which is the second adjuster and the screw 71 which is the first adjuster.

Next, the method to assemble the watch main body as the electronic device according to the present embodiment, and the method to adjust the antenna characteristics are described. As the method to adjust the antenna characteristics, according to the present embodiment, the antenna frequency is adjusted. However, the antenna characteristic that can be adjusted according to the present configuration is not limited to frequency.

When the watch main body 100 is assembled, the hole 12 is formed in a predetermined position of the circumference wall of the metal main body case 1 so as to penetrate in the thickness direction. The substrate 6 and other various electronic components are provided inside the main body case 1.

The concave portion 41 is provided in a position on the rear surface side (lower side, non-viewing side) of the annular shaped antenna element 4 in a position corresponding to the hole 12 on the main body case 1 side when the components are assembled. The female thread is formed on the inner circumferential surface of the concave portion 41. Then, one end side of the screw 71 which is the first adjuster and in which the male thread is formed on the outer circumference surface is screwed in the concave portion 41.

When all of the screws 71 (four in the example shown in FIG. 1) are attached to the concave portion 41 of the antenna element 4, the antenna element 4 is provided on the upper side of the main body case 1, and the other end side (free end side) of the screw 71 attached to the rear surface of the antenna element 4 is inserted in the hole 12 of the main body case 1.

Further, the nut 72 which is the second adjuster is inserted from below in the hole 12 which is the through hole, and the male thread of the screw 71 is screwed to the female thread of the nut 72. With this, the nut 72 which is the second adjuster exists between the hole 12 as the conductive cylinder shaped portion with the same potential as the GND and the screw which is the first adjuster. That is, the conductive cylinder shaped portion with the GND potential is provided around the outside of the metal screw 71 and the resin nut 72 that surrounds the metal screw 71.

After the entire nut 72 is screwed into the hole 12, the antenna characteristics (frequency according to the present embodiment) are inspected in this state.

As a result of the inspection, if the antenna is in resonance with the radio wave at the desired frequency, the adjustment of the antenna characteristics ends.

If the result of the inspection shows that the antenna is not in resonance with the radio wave at the desired frequency, the antenna characteristics are further adjusted. Specifically, the following adjustments are performed.

Figure 5:
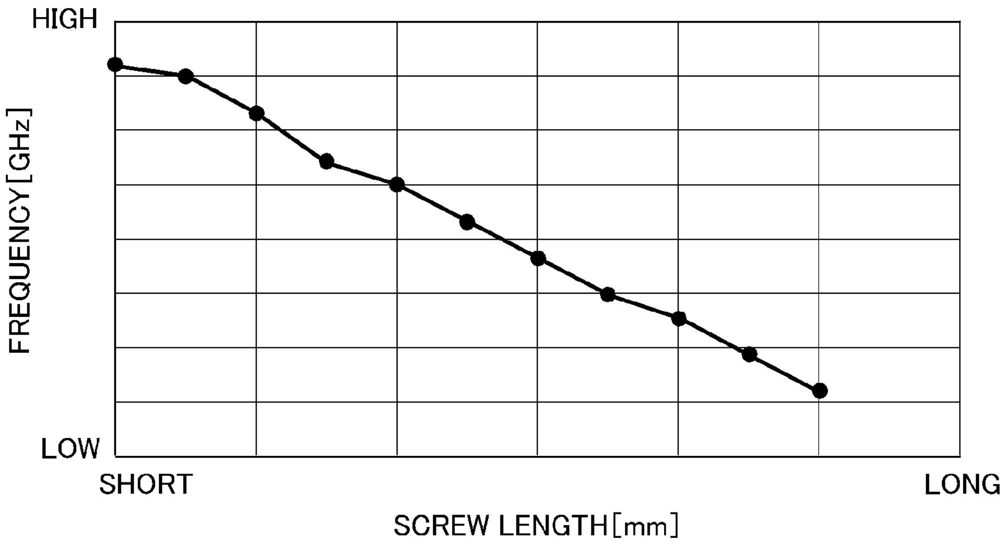
FIG. 5 is a graph showing a tendency of a result of a simulation of a relation between a length of a screw and a frequency of the antenna.

FIG. 5 is a graph showing a tendency of a result of simulation regarding the relation between a length of the screw and the frequency of the antenna (gain peak frequency).

When the height (length) of the nut 72 is constant as in the present embodiment (FIG. 3 and FIG. 4 illustrate when the nut 72 is provided in the entire height direction of the main body case 1), as shown in FIG. 5, it is possible to see the tendency that as the length [mm] of the screw 71 becomes longer, the frequency [GHz] of the antenna becomes lower.

That is, according to the present embodiment, the screw 71 is a metal member that comes into contact with the antenna 4. In the amount that the length [mm] of the screw 71 becomes longer, the overlapping portion of the resin nut 72 and the metal screw 71 in the hole 12 as the conductive cylinder shaped portion with the same potential as the GND becomes larger. Therefore, the capacitance formed between the GND and the antenna element 4 (that is, capacitance of the capacitor between the antenna element 4 and the GND) becomes large. With this, the frequency of the antenna tends to decrease.

As a result of the inspection, if the present antenna frequency is higher than the desired frequency, as shown in FIG. 4, the length of the screw 71 which is the first adjuster is made longer. With this, the capacitance between the antenna element 4 and the GND (rear lid 3) becomes large, and the antenna frequency becomes low.

Conversely, if the present antenna frequency is lower than the desired frequency, the length of the screw 71 which is the first adjuster is made shorter. With this, the capacitance between the antenna element 4 and the GND (rear lid 3) becomes small, and the antenna frequency becomes high.

In this manner, the length of the screw 71 is adjusted until the antenna frequency becomes a desired level.

According to the present embodiment, as described above, the characteristic adjuster 7 is provided in four positions in the circumferential direction of the main body case 1, and the length of the screw 71 can be adjusted in all four of the characteristic adjusters 7 or may be performed in some among the characteristic adjusters 7.

If the adjustment is performed in a plurality of characteristic adjusters 7, the adjustment amount may be uniform or the adjustment amount may be changed depending on the characteristic adjuster 7.

The adjustment can be simulated in advance, and each member can be assembled in a state set based on the simulation result when the watch main body 100 is assembled.

When the antenna frequency becomes a desired frequency, the adjustment of the antenna characteristics ends, and the rear lid 3 is attached from the lower side of the main body case 1 in order to close the opening on the lower side.

Here, as shown in FIG. 3 and FIG. 4, the rear lid 3 is provided so as to cover the resin nut 72. Therefore, the resin nut 72 can be hidden so that it is not visible from the outside.

Further, a fixing means with excellent outer appearance such as a metal screw may be used in order to fix the rear lid 3 to the main body case 1 side. With this, it is possible for the watch main body 100 to have an excellent outer appearance.

The assembly of the watch main body 100 is completed according to the above.

According to the above configuration, the length of the screw 71 may be adjusted finely in order to match the antenna characteristics (frequency) to the desired level.

As described above, according to the present embodiment, the watch main body 100 which is the electronic device includes, the main body case 1, the annular shaped antenna element 4 provided on the upper side of the main body case 1, the screw 71 which is the first adjuster, which is formed of a metal material, and which is provided so that the one end side comes into contact with the antenna element 4, and the other end side is provided in the main body case 1, the hole 12 which is formed of a metal material and which is a cylinder shape in which the other end side of the screw 71 is inserted, and the nut 72 which is the second adjuster, which is formed of a dielectric material, and which is provided in the hole 12 so as to exist between the hole 12 and the screw 71.

According to the above configuration, even if the design of the watch main body 100 which is the electronic device is changed after determining the position and the configuration of the antenna (antenna element 4), and the shape of the surrounding components are determined, the characteristic of the antenna such as frequency can be easily adjusted by the screw 71 which is the first adjuster and the nut 72 which is the second adjuster without a heavy burden or cost such as having to redo the design of the antenna.

With this, even if there are changes in each section after determining the configuration and the various designs of the watch main body 100 which is the electronic device, the adjustment of the antenna characteristic such as the frequency can be easily performed, and the match can be made accurately.

Since the antenna characteristics can be accurately matched in the watch main body 100 (electronic device) which is the product, the performance of the antenna can be sufficiently brought out, and a watch main body 100 (electronic device) including a highly sensitive antenna can be provided.

The configuration is not limited to positioning the first adjuster (screw 71) so that the one end side is in contact with the antenna element 4. The first adjuster is to be provided near the antenna element 4 to the extent that the first adjuster can be capacitively coupled with the antenna element 4 and the freedom of the position where the member that functions as the first adjuster is placed is widely acceptable.

According to the present embodiment, the degree that the screw 71 which is the first adjuster is overlapped with the nut 72 which is the second adjuster in the hole 12 which is the cylinder shaped portion (area of the overlapped range) can be adjusted.

Specifically, the degree that the screw 71 which is the first adjuster overlaps with the nut 72 which is the second adjuster in the hole 12 (area of the overlapped range) can be adjusted by changing the length of the screw 71 inserted in the hole 12 which is the cylinder shaped portion.

With this, the antenna characteristics such as the antenna frequency can be easily adjusted according to the design of the electronic device in which the antenna is incorporated.

According to the present embodiment, the adjustment is performed by changing the length of the screw 71. Therefore, the adjustment can be made without changing the shape and the size of the nut 72. Therefore, high mass productivity can be achieved.

If the first adjuster is the metal screw 71 as in the present embodiment, the manufacturing and fine adjustment can be performed relatively easily, and the increase in cost can be prevented.

If the second adjuster is the nut 72 which is formed of resin and which incudes a shape corresponding to the first adjuster (screw 71 of the present embodiment) as in the present embodiment, the manufacturing can be performed relatively easily, and the increase in cost can be prevented.

According to the present embodiment, the entire screw 71 which is the first adjuster is positioned on the non-visible side of the antenna element 4.

Therefore, it is possible to avoid affecting the outer appearance of the electronic device (watch main body 100) due to providing the screw 71, and it is possible to obtain the electronic device (watch main body 100) with an excellent design.

According to the present embodiment, the male thread of the screw 71 which is the first adjuster is screwed to the female thread of the nut 72 which is the second adjuster.

Therefore, the portion in which the male thread is screwed to the female thread functions as the sealing member to make the inside of the main body case 1 watertight. Therefore, even if a separate sealing member is not provided, the watertight properties inside of the main body case 1 can be secured.

The sealing member to make the inside of the main body case 1 watertight is not limited to the portion where the male thread is screwed to the female thread. For example, a gasket, an O-ring, or the like can be provided as the sealing member (first sealing member) that seals between the hole 12 which is the cylinder shaped portion or the nut 72 which is the second adjuster and the screw 71 which is the first adjuster around the axis of the screw 71 which is the first adjuster in order to make the inside of the main body case 1 watertight.

In this case, the watertight properties inside the main body case 1 can be secured even more.

When the main body case 1 is a metal case formed of the metal material as in the present embodiment, the hole 12 formed in the main body case 1 can be the metal cylinder shaped portion.

Therefore, there is no need to prepare a separate component, and the configuration can be simplified.

According to the present embodiment, the dielectric member 5 is provided between the antenna element 4 and the main body case 1.

With this, the short circuit does not occur even if the antenna element 4 is positioned on the metal main body case 1.

When the dielectric member 5 is positioned between the antenna element 4 and the main body case 1 as described above, the dielectric member can function as the sealing member (second sealing member) that secures the watertight properties inside the main body case 1.

In this case, there is no need to provide a separate sealing member, and the number of components can be suppressed.

According to the present embodiment, the resin nut 72 is used as the second adjuster, and the rear lid 3 as the lid member that closes the lower side opening of the main body case 1 is provided so as to cover the nut 72.

Therefore, this prevents the resin nut 72 from appearing in the outer appearance, and it is possible to achieve an electronic device (watch main body 100) with excellent design.

Further, the rear lid 3 can be fixed to the main body case 1 with a metal screw, and in this case, the rear lid 3 can be fixed strongly, and a watch main body 100 with an excellent outer appearance can be obtained.

Second Embodiment

Next, the second embodiment of the electronic device and the antenna characteristic adjusting method according to the present invention is described with reference to FIG. 6 to FIG. 9. According to the first embodiment, the characteristic adjuster changes the length of the screw which is the first adjuster in order to adjust the antenna characteristics. The second embodiment is different from the first embodiment in that the characteristic adjuster changes the height of the nut which is the second adjuster in order to adjust the antenna characteristics. The points different from the first embodiment are described below.

In FIG. 6 to FIG. 9, the same reference numerals are applied to the components which are the same as those in the first embodiment, and the description is omitted.

Figure 6:
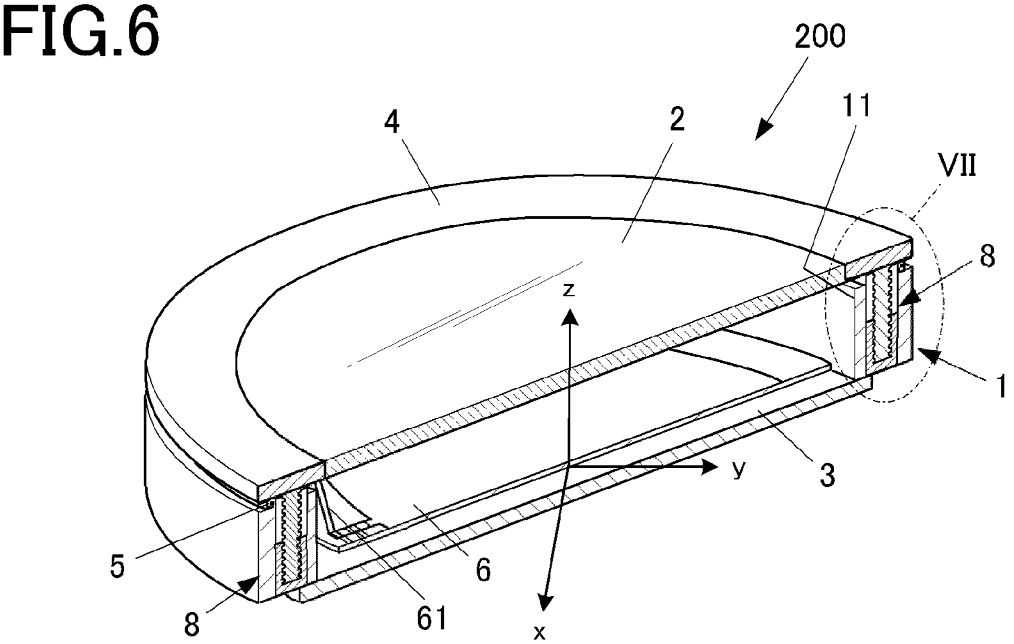
FIG. 6 is a cross-sectional view of a main portion of the watch main body which is the electronic device according to the second embodiment.

FIG. 6 is a cross-sectional view of the main portion of the watch main body which is the electronic device according to the present embodiment.

Figure 7:
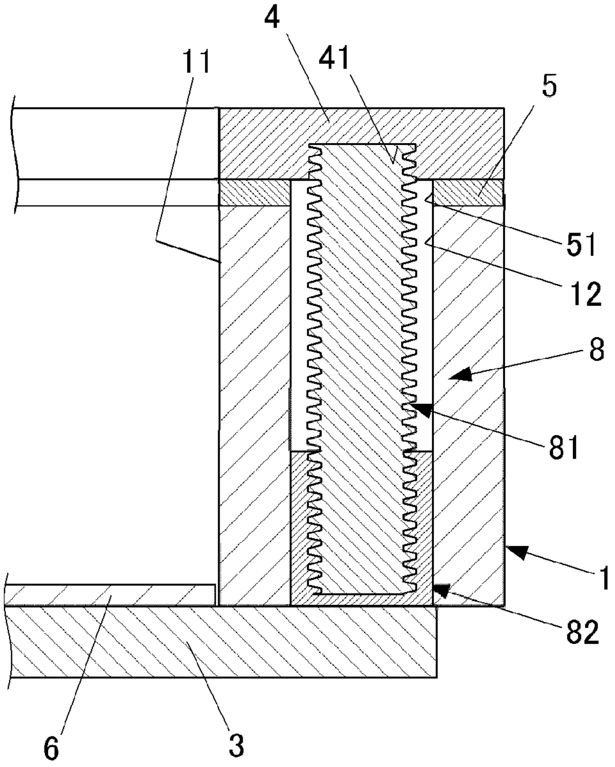
FIG. 7 is an enlarged cross-sectional view of the surroundings of the characteristic adjuster shown with a frame with a long and short dash line VII in FIG. 6.
Figure 8:
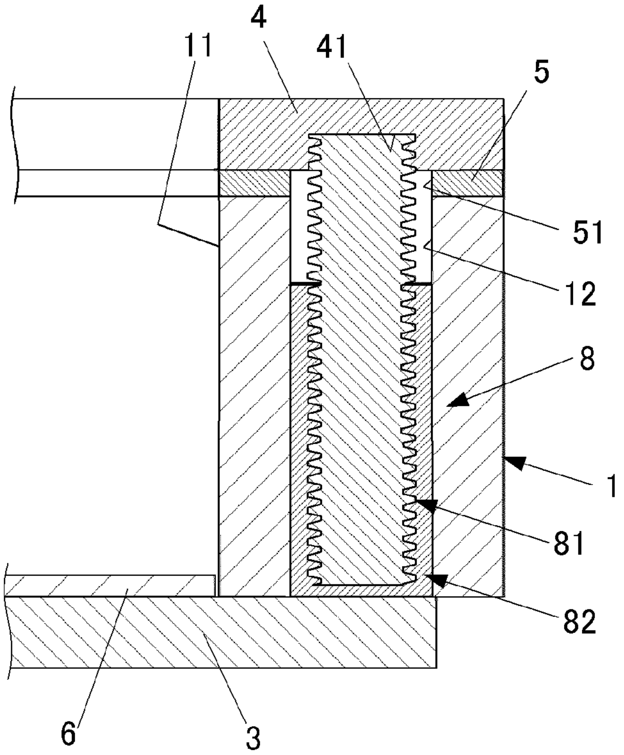
FIG. 8 is a diagram showing an enlarged cross-sectional view of the surroundings of the characteristic adjuster shown with the frame with a long and short dash line VII in FIG. 6, and a height of a nut being higher than FIG. 7.

FIG. 7 and FIG. 8 are enlarged cross-sectional views of the portion surrounding the characteristic adjuster enclosed by the short and long dash line frame VII in FIG. 6.

As shown in FIG. 7 and FIG. 8, the characteristic adjuster 8 provided in the watch main body 200 which is the electronic device according to the present embodiment includes a screw 81 which is the first adjuster, a nut 82 which is the second adjuster, and a hole 12 which is a cylinder shaped portion.

According to the present embodiment, the length of the screw 81 which is the first adjuster is constant, and has a length substantially the same as the thickness of the main body case 1 (height of the main body case 1, height in the Z-axis direction in FIG. 6) in the illustrated example.

The end of the screw 81 on the side inserted in the hole (lower side end in FIG. 7 and FIG. 8) is received by the nut 82, and the screw 81 does not come into contact with the main body case 1 (hole 12 formed in the main body case 1) and the metal rear lid 3.

Similar to the first embodiment, the nut 82 is formed with a dielectric material such as resin, and is provided to exist between the hole 12 which is the cylinder shaped portion and the screw 81 which is the first adjuster. By positioning the nut 82 between the hole 12 and the screw 81, it is a state in which a cylinder shaped conductor with a GND potential is provided around the outer circumference of the metal screw 81 and the resin nut 82 surrounding the metal screw 81.

According to the present embodiment, the nut 82 which is the second adjuster is a member in which the height is adjusted in order to adjust the characteristic of the antenna such as frequency.

The other configurations are similar to the first embodiment. The same reference numerals are applied to the same components, and the description is omitted.

Next, the adjusting method of the antenna characteristic according to the present embodiment is described. The method to assemble the watch main body 200 (electronic device) other than the adjustment of the antenna characteristics is similar to the first embodiment, and the description is omitted.

As a result of inspecting the antenna characteristic (frequency according to the present embodiment) as in the first embodiment, when the antenna is in resonance with the radio wave of the desired frequency, the adjustment of the antenna characteristics ends.

If the result of the inspection shows that the antenna is not in resonance with the radio wave at the desired frequency, the antenna characteristics are further adjusted. Specifically, the following adjustments are performed.

Figure 9:
FIG. 9 is a graph showing a tendency of a result of a simulation of a relation between the height of the nut and the frequency of the antenna.

FIG. 9 is a graph showing the tendency of the result of the simulation regarding the relation between the height of the nut and the frequency of the antenna (gain peak frequency).

When the length of the screw 81 is constant as in the present embodiment (FIG. 7 and FIG. 8 illustrate when the screw 81 is provided in the entire height direction of the main body case 1), as shown in FIG. 9, it is possible to see the tendency that as the height (length) [mm] of the nut 82 becomes longer, the frequency [GHz] of the antenna becomes lower.

That is, according to the present embodiment, the screw 81 is a metal member that comes into contact with the antenna element 4. If the height (length) [mm] of the nut 82 becomes higher, the overlapping portion of the resin nut 82 and the metal screw 81 in the hole 12 as the conductive cylinder shaped portion with the same potential as the GND becomes larger. Therefore, the capacitance formed between the GND and the antenna element 4 (that is, capacitance of the capacitor between the antenna element 4 and the GND) becomes large. With this, the frequency of the antenna tends to decrease.

As a result of the inspection of the antenna characteristics, if the present antenna frequency is higher than the desired frequency, as shown in FIG. 8, the height of the nut 82 which is the second adjuster is made higher. With this, the capacitance between the antenna element 4 and the GND (rear lid 3) becomes large, and the antenna frequency becomes low.

Conversely, if the present antenna frequency is lower than the desired frequency, the height of the nut 82 which is the second adjuster is made lower. With this, the capacitance between the antenna element 4 and the GND (rear lid 3) becomes small, and the antenna frequency becomes high.

In this manner, the height of the nut 82 is adjusted until the antenna frequency is a desired level.

Similar to the first embodiment, if a plurality of characteristic adjusters 8 are provided, the adjustment can be performed in all of the characteristic adjusters 8 or the adjustment can be performed in some among the characteristic adjusters 8.

If the adjustment is performed in a plurality of characteristic adjusters 8, the adjustment amount may be uniform or the adjustment amount may be changed depending on the characteristic adjuster 8.

The other points are similar to the first embodiment and the description is omitted.

According to the above configuration, the height of the nut 82 may be adjusted finely in order to match the antenna characteristics (frequency) to the desired level.

According to the present embodiment, in addition to achieving the effects similar to the first embodiment, the following effects can be achieved.

Specifically, according to the present embodiment, the degree that the screw 81 which is the first adjuster overlaps with the nut 82 which is the second adjuster in the hole 12 (area of the overlapped range) which is the cylinder shaped portion is adjusted by changing the height (length) of the nut 82 which is the second adjuster formed of resin.

The resin nut 82 can be manufactured relatively easily. With this, the antenna characteristics such as the antenna frequency can be easily adjusted according to the design of the electronic device (watch main body 200) in which the antenna is incorporated without increasing the burden and cost.

In this case, the adjustment can be made without changing the shape and the size of the metal screw 81. Therefore, high mass productivity can be achieved.

Third Embodiment

Next, the third embodiment of the electronic device and the antenna characteristic adjusting method according to the present invention is described with reference to FIG. 10 and FIG. 11. The third embodiment is the same as the first embodiment in that the characteristic adjuster changes the length of the screw which is the first adjuster in order to adjust the antenna characteristics. However, the present embodiment is different from the first embodiment in that according to the first embodiment, the main body case 1 is formed of a metal material whereas according to the present embodiment, the main body case 1 is formed of a resin material. The points different from the first embodiment are described below.

Figure 10:
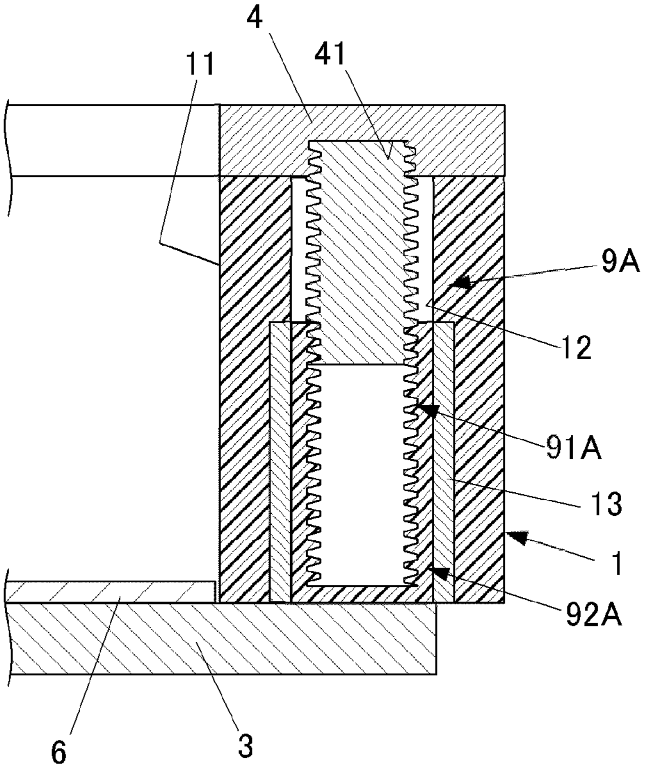
FIG. 10 is an enlarged cross-sectional view of the surroundings of the characteristic adjuster according to the third embodiment.
Figure 11:
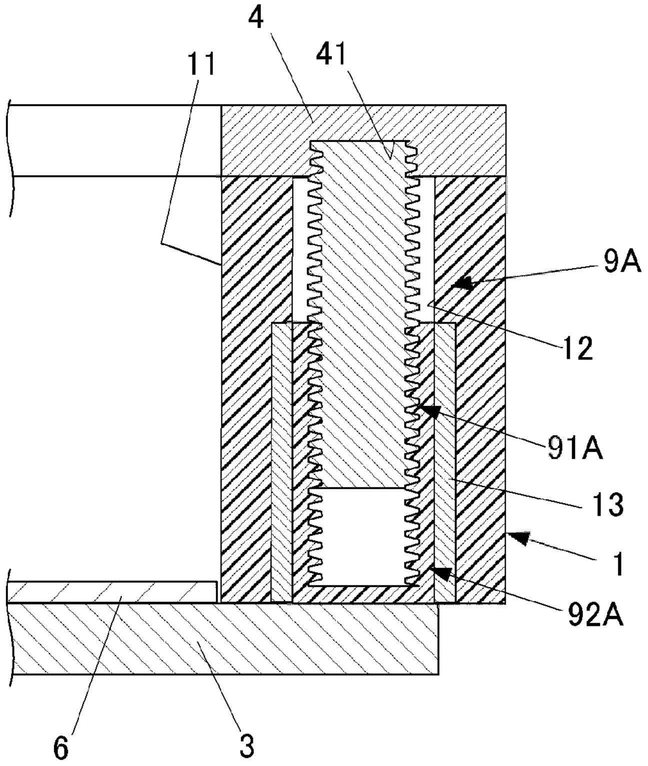
FIG. 11 is an enlarged cross-sectional view of the surroundings of the characteristic adjuster according to the third embodiment and shows a length of the screw being longer than FIG. 10.

In FIG. 10 and FIG. 11, the same reference numerals are applied to the components which are the same as the first embodiment, and the description is omitted.

FIG. 10 and FIG. 11 are enlarged cross-sectional views of the portion surrounding the characteristic adjuster according to the present embodiment.

According to the present embodiment, the main body case 1 is formed of a hard resin such as ABS resin.

The material with which the main body case 1 is formed is not limited to resin and various other material such as ceramics can be applied. Further, various composite material in which carbon filler, glass fiber and the like are kneaded in various resins can be used. The strength of the main body case 1 can be enhanced by forming the main body case 1 with such composite material.

The antenna element 4 is provided on the main body case 1.

If the main body case 1 is made of resin as in the present embodiment, the short circuit does not occur even if the antenna element 4 is placed directly on the main body case 1.

Therefore, as shown in FIG. 10 and FIG. 11, according to the present embodiment, there is no need to provide an insulating member such as a dielectric member 5 between the antenna element 4 and the main body case 1. In order to secure the watertight properties inside the main body case 1 even more, a resin member may be provided between the antenna element 4 and the main body case 1.

On the rear surface side of the antenna element 4, similar to the first embodiment, the screw 91A which is the first adjuster is provided so as to come into contact with the antenna element 4.

According to the present embodiment, the screw 91A as the first adjuster is a member in which the length is adjusted in order to adjust the characteristics of the antenna such as the frequency.

Similar to the first embodiment, the electronic device (watch main body) according to the present embodiment includes a plurality of characteristic adjusters 9A.

The characteristic adjuster 9A according to the present embodiment includes a screw 91A as the first adjuster, a nut 92A as the second adjuster, and a cylinder shaped member 13 as the cylinder shaped portion.

According to the main body case 1, the hole 12 which penetrates the thickness direction of the main body case 1 (height direction, up-down direction shown in FIG. 10 and FIG. 11) is formed in the surrounding wall portion corresponding to the position in which the screw 91A which is the first adjuster included in the characteristic adjuster 9A is provided.

The cylinder shaped member 13 is provided in the hole 12.

The cylinder shaped member 13 is open on the top and the bottom, and as shown in FIG. 10 and FIG. 11, the lower end of the cylinder shaped member 13 is in contact with the rear lid 3. According to the present embodiment, the rear lid 3 is formed of a metal conductor and functions as the GND. The cylinder shaped member 13 which is the cylinder shaped portion that comes into contact with the rear lid 3 is a conductor that has the same potential as the GND. By providing the cylinder shaped member 13 around the outer circumference of the metal screw 91A and the resin nut 92A surrounding the metal screw 91A, the cylinder shaped conductor with the GND potential is provided around the screw 91A and the nut 92A.

The cylinder shaped member 13 is to be a member in which the lower end comes into contact with the rear lid 3 and the upper end is separated from the antenna element 4 to a certain extent (to the extent that capacitive coupling does not occur). The height to which the cylinder shaped member 13 is provided in the hole 12 is set appropriately.

The nut 92A which is the second adjuster is provided in the cylinder shaped member 13. According to the present embodiment, the height (length) of the nut 92A is constant. According to the illustrated example, the nut 92A is provided so that the height is to be about the same as the height of the cylinder shaped member 13.

The other configurations are similar to the first embodiment. The same reference numerals are applied to the same components, and the description is omitted.

Next, the adjusting method of the antenna characteristic according to the present embodiment is described. The method to assemble the watch main body (electronic device) other than the adjustment of the antenna characteristics is similar to the first embodiment, and the description is omitted.

As a result of inspecting the antenna characteristic (frequency according to the present embodiment) as in the first embodiment, when the antenna is in resonance with the radio wave of the desired frequency, the adjustment of the antenna characteristics ends.

If the result of the inspection shows that the antenna is not in resonance with the radio wave at the desired frequency, the antenna characteristics are further adjusted. Specifically, the following adjustments are performed.

When the height (length) of the nut 92A is constant as in the present embodiment (FIG. 10 and FIG. 11 illustrate when the nut 92A is provided in the entire height direction of the cylinder shaped member 13), there is a tendency that as the length [mm] of the screw 91A becomes longer, the frequency [GHz] of the antenna becomes lower.

That is, according to the present embodiment, the screw 91A is a metal member that comes into contact with the antenna 4. If the length [mm] of the screw 91A becomes longer, the overlapping portion of the resin nut 92A and the metal screw 91A in the cylinder shaped member 13 as the conductive cylinder shaped portion with the same potential as the GND becomes larger. Therefore, the capacitance formed between the GND and the antenna element 4 (that is, capacitance of the capacitor between the antenna element 4 and the GND) becomes large. With this, the frequency of the antenna tends to decrease.

As a result of the inspection, if the present antenna frequency is higher than the desired frequency, as shown in FIG. 11, the length of the screw 91A which is the first adjuster is made longer. With this, the capacitance between the antenna element 4 and the GND (rear lid 3) becomes large, and the antenna frequency becomes low.

Conversely, if the present antenna frequency is lower than the desired frequency, the length of the screw 91A which is the first adjuster is made shorter. With this, the capacitance between the antenna element 4 and the GND (rear lid 3) becomes small, and the antenna frequency becomes high.

In this manner, the length of the screw 91A is adjusted until the antenna frequency becomes a desired level.

Similar to the first embodiment, if a plurality of characteristic adjusters 9A are provided, the adjustment can be performed in all of the characteristic adjusters 9A or the adjustment can be performed in some among the characteristic adjusters 9A.

If the adjustment is performed in a plurality of characteristic adjusters 9A, the adjustment amount may be uniform or the adjustment amount may be changed depending on the characteristic adjuster 9A.

The other points are similar to the first embodiment and the description is omitted.

According to the above configuration, the length of the screw 91A may be adjusted finely in order to match the antenna characteristics (frequency) to the desired level.

According to the present embodiment, in addition to achieving the effects similar to the first embodiment, the following effects can be achieved.

As described above, according to the present embodiment, the main body case 1 is formed of resin. The metal cylinder shaped member 13 is provided as the cylinder shaped portion in the main body case. The screw 91A which is the metal first adjuster is provided so as to come into contact or so as to be near the annular-shaped antenna element 4 provided on the upper side of the main body case 1. The screw 91A is provided so that the other end side is inserted in the cylinder shaped member 13. The nut 92A which is the second adjuster is formed of a dielectric material. The nut 92A is provided so as to exist between the cylinder shaped member 13 and the screw 91B. In such apparatus, the antenna characteristics such as the frequency is adjusted by changing the length of the screw 91A inserted in the cylinder shaped member 13 and adjusting the degree of overlapping of the screw 91A and the nut 92A in the cylinder shaped member 13 (area of the overlapped range).

With this, even in the electronic device (watch main body) including the resin case, by simply changing the length of the screw 91A which is the first adjuster, the antenna with the desired characteristic (frequency, etc.) can be obtained simply without changing the other configuration and the design.

Fourth Embodiment

Next, the fourth embodiment of the electronic device and the antenna characteristic adjusting method according to the present invention is described with reference to FIG. 12 and FIG. 13. The fourth embodiment is the same as the second embodiment in that the characteristic adjuster changes the height of the nut which is the second adjuster in order to adjust the antenna characteristics. However, the present embodiment is different from the second embodiment in that according to the second embodiment, the main body case 1 is formed of metal material whereas according to the present embodiment, the main body case 1 is formed of resin material similar to the third embodiment. The points different from the second and third embodiments are described below.

Figure 12:
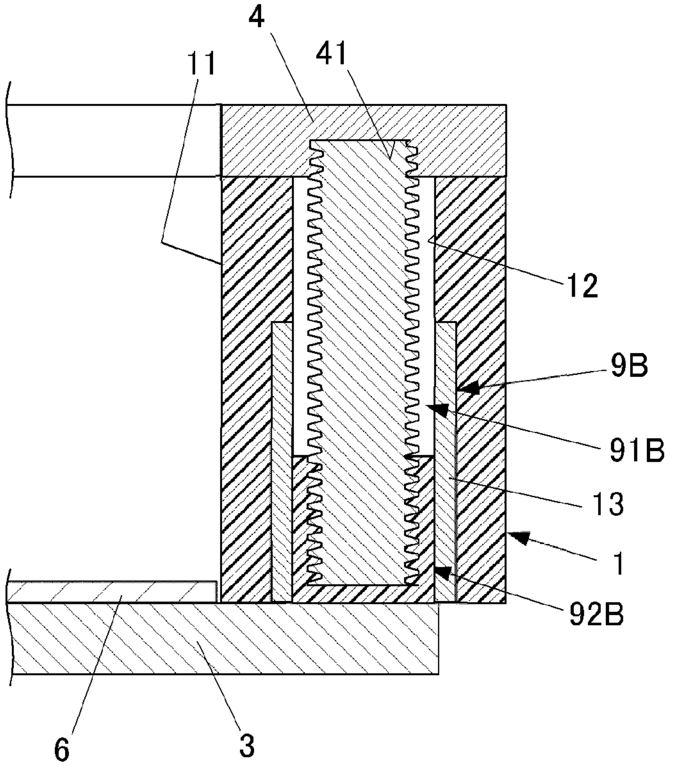
FIG. 12 is an enlarged cross sectional view showing the surroundings of the characteristic adjuster according to the fourth embodiment.
Figure 13:
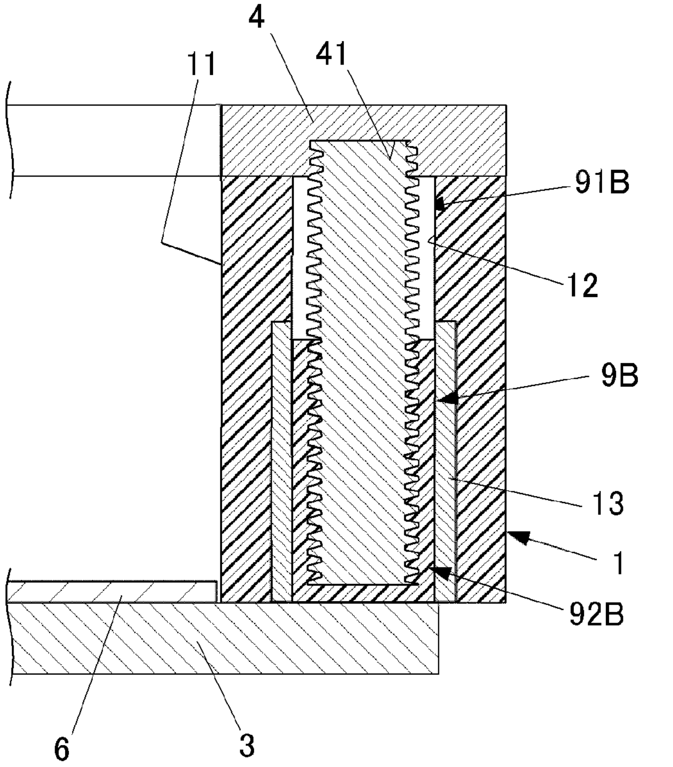
FIG. 13 is an enlarged cross-sectional view of the surroundings of the characteristic adjuster according to the fourth embodiment and shows a height of the nut being higher than FIG. 12.

In FIG. 12 and FIG. 13, the same reference numerals are applied to the components which are the same as the second and third embodiments, and the description is omitted.

FIG. 12 and FIG. 13 are enlarged cross-sectional views of the portion surrounding the characteristic adjuster according to the present embodiment.

Similar to the first embodiment, the electronic device (watch main body) according to the present embodiment includes a main body case 1, an antenna element 4, and a plurality of characteristic adjusters 9B.

Similar to the third embodiment, the main body case 1 is a resin case formed of various resins.

Similar to the third embodiment, the characteristic adjuster 9B includes a screw 91B as the first adjuster, a nut 92B as the second adjuster, and a cylinder shaped member 13 as the cylinder shaped portion. The cylinder shaped member 13 is in contact with the rear lid 3 that functions as the GND and is the conductor with the same potential as the GND.

As shown in FIG. 12 and FIG. 13, according to the present embodiment, the length of the screw 91B which is the first adjuster is constant, and has a length substantially the same as the thickness of the main body case 1 (height of the main body case 1) in the illustrated example.

The end of the screw 91B on the inserting side inserted to the cylinder shaped member 13 (lower side end in FIG. 12 and FIG. 13) is received by the nut 92B, and the screw 91B does not come into contact with the cylinder shaped member 13 provided in the hole 12 of the main body case 1 and the metal rear lid 3.

Similar to the second and third embodiments, the nut 92B is formed of a resin dielectric material. The nut 92B is positioned between the cylinder shaped member 13 which is the cylinder shaped portion and the screw 91B which is the first adjuster. By providing the cylinder shaped member 13 around the outer circumference of the metal screw 91B and the resin nut 92B surrounding the metal screw 91B, the cylinder shaped conductor with the GND potential is provided around the screw 91B and the nut 92B.

According to the present embodiment, the nut 92B which is the second adjuster is a member in which the height is adjusted in order to adjust the characteristics of the antenna such as the frequency.

The other configurations are similar to the second and third embodiments. The same reference numerals are applied to the same components, and the description is omitted.

Next, the adjusting method of the antenna characteristic according to the present embodiment is described. The method to assemble the watch main body (electronic device) other than the adjustment of the antenna characteristics is similar to the second and third embodiments, and the description is omitted.

As a result of inspecting the antenna characteristics (frequency according to the present embodiment) as in the second and third embodiments, when the antenna is in resonance with the radio wave of the desired frequency, the adjustment of the antenna characteristics ends.

If the result of the inspection shows that the antenna is not in resonance with the radio wave at the desired frequency, the antenna characteristics are further adjusted. Specifically, the following adjustments are performed.

When the length of the screw 91B is constant as in the present embodiment (FIG. 12 and FIG. 13 illustrate when the screw 91B is provided in the entire height direction of the main body case 1), there is a tendency that as the height (length) [mm] of the nut 92B becomes longer, the frequency [GHz] of the antenna becomes lower.

That is, according to the present embodiment, the screw 91B is a metal member that comes into contact with the antenna 4. If the height (length) [mm] of the nut 92B becomes higher, the overlapping portion of the resin nut 92B and the metal screw 91B in the cylinder shaped member 13 as the conductive cylinder shaped portion with the same potential as the GND becomes larger. Therefore, the capacitance formed between the GND and the antenna element 4 (that is, capacitance of the capacitor between the antenna element 4 and the GND) becomes large. With this, the frequency of the antenna tends to decrease.

As a result of the inspection of the antenna characteristics, if the present antenna frequency is higher than the desired frequency, as shown in FIG. 13, the height of the nut 92B which is the second adjuster is made higher. With this, the capacitance between the antenna element 4 and the GND (rear lid 3) becomes large, and the antenna frequency becomes low.

Conversely, if the present antenna frequency is lower than the desired frequency, the height of the nut 92B which is the second adjuster is made lower. With this, the capacitance between the antenna element 4 and the GND (rear lid 3) becomes small, and the antenna frequency becomes high.

In this manner, the height of the nut 92B is adjusted until the antenna frequency is a desired level.

Similar to the second and third embodiments, if a plurality of characteristic adjusters 9B are provided, the adjustment can be performed in all of the characteristic adjusters 9B or the adjustment can be performed in some among the characteristic adjusters 9B.

If the adjustment is performed in a plurality of characteristic adjusters 9B, the adjustment amount may be uniform or the adjustment amount may be changed depending on the characteristic adjuster 9B.

The other points are similar to the second and third embodiment and the description is omitted.

According to the above configuration, the height of the nut 92B may be adjusted finely in order to match the antenna characteristics (frequency) to the desired level.

As described above, according to the present embodiment, the main body case 1 is formed of resin. The metal cylinder shaped member 13 is provided as the cylinder shaped portion in the main body case. The screw 91B which is the metal first adjuster is provided so as to come into contact or so as to be near the annular-shaped antenna element 4 provided on the upper side of the main body case 1. The screw 91B is provided so that the other end side is inserted in the cylinder shaped member 13. The nut 92B which is the second adjuster is formed of a dielectric material. The nut 92B is provided so as to exist between the cylinder shaped member 13 and the screw 91B. In such apparatus, the antenna characteristics such as the frequency is adjusted by changing the height of the nut 92B positioned in the cylinder shaped member 13 and adjusting the degree of overlapping of the screw 91B and the nut 92B in the cylinder shaped member 13 (area of the overlapped range).

With this, even in the electronic device (watch main body) including the resin case, by simply changing the height of the nut 92B which is the second adjuster, the antenna with the desired characteristic (frequency, etc.) can be obtained simply without changing the other configuration and the design.

The nut 92B is a resin member, and the height can be relatively easily changed and adjusted.

The embodiments of the present invention are described above, but the present invention is not limited to the above embodiment, and various modifications are possible without leaving the scope of the present invention.

For example, according to the above embodiments, the screw which is the first adjuster is a grub screw in which a male thread is formed on the entire circumference but the configuration of the screw is not limited to the above.

For example, only the portion of the screw in contact with the antenna element 4 (portion inserted in the concave portion 41) may be provided with the male thread, and the male thread is not provided in the portion which is inserted in the cylinder shaped portion. In this case, the resin second adjuster does not have to be a nut in which the female thread is formed, and may be a simple resin cylinder shaped member.

In such case in which the screw and nut do not screw to each other, the antenna element 4 cannot be fixed to the main body case using the screw which is the first adjuster and the nut which is the second adjuster.

Therefore, in this case, the antenna element 4 is fixed to the main body case by fixing measures such as press fitting.

If the screw which is the first adjuster is not fixed with the antenna element 4 (for example, when the one end side of the screw is simply in contact with the antenna element 4 or the screw is placed close enough to be capacitively coupled), similarly, the antenna element 4 is fixed to the main body case by press fitting.

According to the above embodiments, the screw which is the first adjuster is a grub screw, but the first adjuster is not limited to the grub screw.

Figure 14:
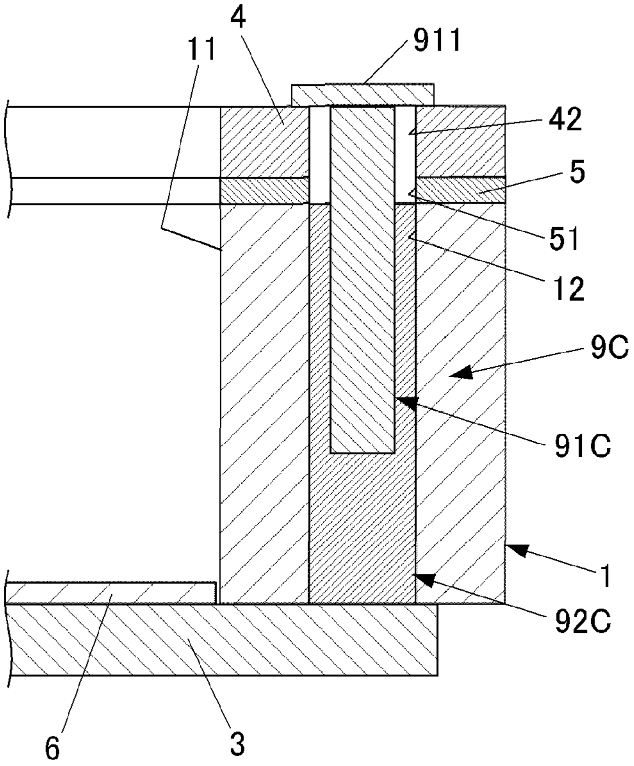
FIG. 14 is an enlarged cross-sectional view of the surroundings of the characteristic adjuster according to a modification of the first embodiment.
Figure 15:
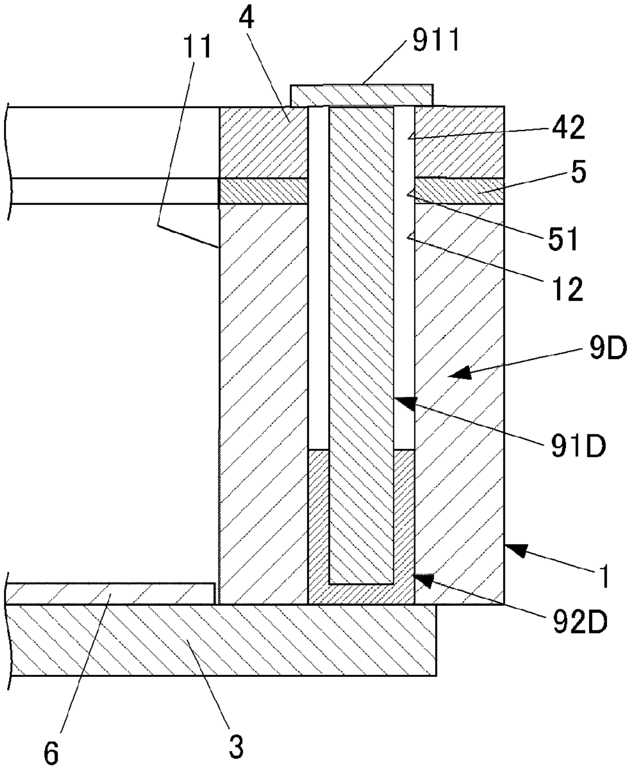
FIG. 15 is an enlarged cross-sectional view of the surroundings of the characteristic adjuster according to a modification of the second embodiment.

For example, as shown in FIG. 14 and FIG. 15, a through hole 42 which penetrates the thickness direction can be provided in the antenna element 4, and head screws 91C, 91D such as a flat countersunk screw or a pan head screw including a screw head 911 that has a larger outer diameter than the inner diameter of the through hole 42 can be used as the first adjuster of characteristic adjusters 9C, 9D.

As in the head screws 91C and 91D shown in FIG. 14 and FIG. 15, when the male thread is not formed around the axis of the first adjuster, the second adjuster which received the above does not have to be a nut.

That is, as shown in FIG. 14 and FIG. 15, the second adjuster may be adhesive 92C, 92D that is filled in the cylinder shaped portion to exist between the head screws 91C and 91D which is the first adjuster (or screw illustrated in the first to fourth embodiments) and the cylinder shaped portion. The adhesive 92C, 92D functions as the dielectric material.

In this case, there is no need to mold the second adjuster into a predetermined shape such as a nut in advance, and it is possible to adjust more flexibly to changes in design.

Even when the second adjuster is the adhesive 92C, 92D as described above, for example, similar to the first and third embodiments, the filled amount of the adhesive 92C, 92D is constant (for example, the amount in the same height in the thickness direction of the main body case 1 as shown in FIG. 14). In such state, the adjustment of the antenna characteristics is performed by changing the length of the first adjuster (head screw 91C and 91D and screw) inserted in the above and adjusting the amount that the first adjuster is overlapped with the second adjuster.

In addition, when the second adjuster is the adhesive 92C, 92D, for example, similar to the second and fourth embodiments, the length of the first adjuster (head screws 91C, 91D and screw) inserted in the adhesive 92C, 92D is constant (for example, the length the same as the height in the thickness direction of the main body case 1 as shown in FIG. 15). The adjustment of the antenna characteristics is performed by changing the filled amount of the adhesive 92C, 92D which is the second adjuster, changing the height of the second adjuster, and adjusting the amount that the first adjuster is overlapped with the second adjuster.

For example, the main body case is made of resin and the annular shaped antenna element 4 is provided on the upper side of the main body case 1. In such case, the characteristic adjuster 9E may include a third adjuster (for example, a screw 91E including a screw head 911) and a fourth adjuster (for example, a screw 92E including a screw head 921). The third adjuster is formed of metal material. The third adjuster is positioned so that one end side comes into contact with or is positioned near the antenna element 4. The other end side is positioned in the main body case 1. The fourth adjuster is formed of a metal material. One end side is inserted in the main body case 1 from the other end side of the screw 91E, and the fourth adjuster is positioned with a predetermined distance from the other end side of the screw 91E.

Figure 16:
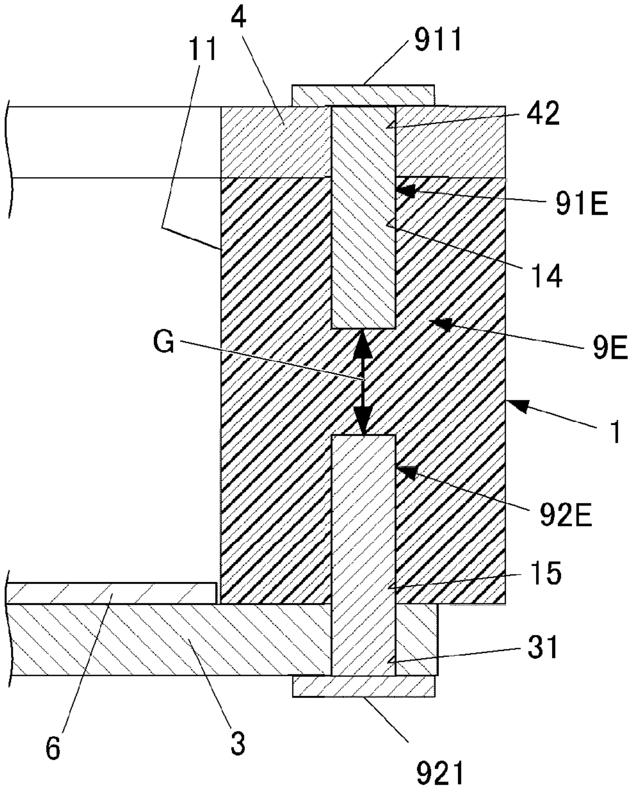
FIG. 16 is an enlarged cross-sectional view of the characteristic adjuster according to a modification of the characteristic adjuster.

In this case, as shown in FIG. 16, for example, a through hole 42 is formed in the antenna element 4. A first hole 14 that does not penetrate to the lower side is provided in the main body case 1 in a position corresponding to the through hole 42 in the antenna element 4. The through hole 31 is formed in the rear lid 3 in a position substantially corresponding to the through hole 42 of the antenna element 4. A second hole 15 that does not penetrate to the upper side is provided in the case 1 in the position corresponding to the through hole 31. In this case, the fourth adjuster (for example, screw 92E including the screw head 921) comes into contact with the rear lid 3. When the rear lid 3 functions as the GND, the rear lid 3 is to be the conductor with the same potential as the GND.

Then, the antenna characteristics may be adjusted by adjusting a gap G between the screw 91E inserted from the upper direction through the through hole 42 and the screw 92E inserted from the lower direction through the through hole 31 and adjusting the space between the third adjuster (screw 91E) and the fourth adjuster (screw 92E).

According to the above configuration, the screw 91E which is the third adjuster and the screw 92E which is the fourth adjuster can be the same shape, and the antenna characteristic can be adjusted while enhancing productivity.

The antenna element 4 and the rear lid 3 can be fixed to the main body case 1 from above and below by using the screw 91E and screw 92E which are for adjusting the antenna characteristics. Therefore, the antenna element and the rear lid 3 can be fixed and the antenna characteristics can be adjusted without increasing the number of components.

According to the above embodiments, the nut 72 which is the second adjuster is in one connection but the shape of the nut is not limited to the above.

The nut which is the second adjuster may include a double nut configuration, for example. In this case, it is difficult to pull out, and the screw which is the first adjuster can be held firmly.

When the nut which is the second adjuster is a double nut divided in a plurality of pieces, each nut can be provided in a state with a space provided in the up-down direction.

When the nut which is the second adjuster is divided in a plurality of pieces, it is expected that the adjustment of the antenna characteristics can be performed more finely by finely adjusting each nut.

According to the first and third embodiments, the degree of overlapping (area of overlapped range) of the first adjuster (screw) and the second adjuster (nut) in the cylinder shaped portion is adjusted by changing the length of the first adjuster (screw) inserted in the cylinder shaped portion. According to the second and fourth embodiments, the degree of overlapping (area of overlapped range) of the first adjuster and the second adjuster (nut) in the cylinder shaped portion is adjusted by changing the height of the second adjuster (nut). With this, the antenna characteristics are adjusted, but the method to adjust the antenna characteristics is not limited to the above.

For example, by changing both the length of the first adjuster (screw) inserted in the cylinder shaped portion and the height of the second adjuster (nut), the degree of overlapping (area of overlapped range) of the first adjuster (screw) and the second adjuster (nut) in the cylinder shaped portion can be adjusted, and with this, the adjustment of the antenna characteristics may be performed.

In this case, each of the first adjuster (screw) and the second adjuster (nut) can be adjusted, and a more flexible adjustment according to the shape of the electronic device including the antenna can be performed.

According to the above embodiments, the rear lid 3 functions as the GND, and the cylinder shaped portion is to be the same potential as the GND by coming into contact with the rear lid 3. However, the component that functions as the GND is not limited to the rear lid 3.

For example, the rear lid 3 is formed of resin, and when the substrate which is positioned on the rear lid 3 functions as the GND, the cylinder shaped portion is to come into contact with the component functioning as the GND such as the substrate, for example. With this, the potential is to be the same as the GND.

According to the present embodiment, the characteristic adjuster is provided buried in the circumference wall of the main body case, however, the characteristic adjuster need only to be provided in the main body case, and the configuration is not limited to providing the characteristic adjuster buried in the circumference wall of the main body case as in the illustrated examples.

For example, the characteristic adjuster can be provided to project to the inner side of the circumference wall of the main body case.

Further, according to the present embodiment, the electronic device is the watch main body 100. However, the electronic device can be widely applied to any device provided with an antenna and is not limited to a time piece (watch, etc.).

For example, the electronic device according to the present invention can be applied to various devices such as pedometers, altimeters, barometers, and the like. Further, the electronic device according to the present invention can be applied to various terminal apparatuses such as smartphones.

Although various embodiments of the present invention are described above, the scope of the present invention is not limited to the above-described embodiments, and the scope of the present invention is defined by the attached claims and is equivalents.

What is claimed is:

1. An electronic device comprising:

an antenna;

a rear lid that functions as a ground;

a first adjuster which is formed of a metal material, and which is provided between the antenna and the rear lid in a position in which one end side is in contact with the antenna or in a position in which at least a part overlaps with the antenna from a planar view from a viewing direction;

a cylinder which is formed of a metal material, and in which the other end side of the first adjuster is inserted; and a second adjuster which is formed of a dielectric material and which is provided in the cylinder to exist between the cylinder and the first adjuster.

2. The electronic device according to claim 1, wherein the cylinder is the same potential as the ground.

3. The electronic device according to claim 1, wherein an area of an overlapped range in which the first adjuster and the second adjuster are overlapped in the cylinder can be adjusted.

4. The electronic device according to claim 3, wherein in a case in which an adjuster with a larger height than the first adjuster is inserted in the cylinder instead of the first adjuster, the overlapped range is increased and a frequency of the antenna is decreased.

5. The electronic device according to claim 3, wherein in a case in which an adjuster with a larger height than the second adjuster is inserted in the cylinder instead of the second adjuster, the overlapped range is increased and a frequency of the antenna is decreased.

6. The electronic device according to claim 1, wherein the first adjuster is a metal screw.

7. The electronic device according to claim 1, wherein the second adjuster is a nut which is formed of resin, and which includes a shape corresponding to the first adjuster.

8. The electronic device according to claim 7, wherein the nut includes a double nut configuration.

9. The electronic device according to claim 1, wherein the second adjuster is an adhesive which is filled in the cylinder and which functions as a dielectric material.

10. The electronic device according to claim 1, wherein the entire first adjuster is provided on a side of the antenna which is not viewed.

11. The electronic device according to claim 1, further comprising a first sealer which makes an inside of the electronic device watertight.

12. The electronic device according to claim 11, wherein the first sealer is a gasket or an O-ring provided between the cylinder or the second adjuster and the first adjuster.

13. The electronic device according to claim 1, wherein the first adjuster is provided in the position in which one end side is in contact with the antenna and in the position in which at least a part overlaps with the antenna from a planar view from a viewing direction.

14. The electronic device according to claim 1, wherein at least a part of a region of the second adjuster comes into contact with the cylinder and the first adjuster and makes an inside of the electronic device watertight.

* * * * *